US008849530B2

(12) United States Patent
Thor

(10) Patent No.: US 8,849,530 B2
(45) Date of Patent: Sep. 30, 2014

(54) DETERMINATION OF TRANSMISSION CLUTCH CONTROL VALUES USING PID CONTROL LOGIC DURING POWER-ON UPSHIFT

(75) Inventor: Todd J. Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 367 days.

(21) Appl. No.: 13/411,964

(22) Filed: Mar. 5, 2012

(65) Prior Publication Data
US 2013/0231835 A1 Sep. 5, 2013

(51) Int. Cl.
G06F 19/00 (2011.01)

(52) U.S. Cl.
USPC .......................................................... 701/67

(58) Field of Classification Search
USPC ..................................... 701/51, 53, 55, 67, 68
See application file for complete search history.

(56) References Cited

U.S. PATENT DOCUMENTS

2013/0153353 A1* 6/2013 Teslak et al. ................. 192/3.54

* cited by examiner

Primary Examiner — Kim T Nguyen
(74) Attorney, Agent, or Firm — Quinn Law Group, PLLC

(57) ABSTRACT

Clutch control values are determined via a method in a vehicle during a power-on upshift. Pressure to an offgoing clutch is decreased to a calibrated holding pressure after onset of the upshift. Proportional-integral-derivative (PID) logic of a controller is used to introduce a calibrated error into a pressure command to the offgoing clutch during fill of the oncoming clutch. This causes a calibrated slip to occur across the offgoing clutch, and a resultant threshold amount of flare to occur in turbine speed. The slip and flare are held using the PID logic. The pressure/torque relationship of the offgoing clutch is recorded. A fill level of the oncoming clutch is determined using a trajectory of an integrator term of the PID logic. A control value of the oncoming or the offgoing clutch is adjusted using at least one of the fill level, the recorded clutch pressure, and the recorded clutch torque.

14 Claims, 2 Drawing Sheets

DETERMINATION OF TRANSMISSION CLUTCH CONTROL VALUES USING PID CONTROL LOGIC DURING POWER-ON UPSHIFT

TECHNICAL FIELD

The present disclosure relates to a method and system for learning transmission clutch control values using proportional-integral-derivative (PID) control logic during a power-on upshift.

BACKGROUND

An automatic transmission includes a number of gear elements and clutches that selectively couple a transmission input shaft with a transmission output shaft. The various clutches are selectively engaged to establish a desired output speed ratio. Clutch engagement is typically achieved via a controlled application of fluid pressure which moves a clutch piston from an initial position into engagement with a friction clutch pack. Shifting from one speed ratio to another is performed automatically by a transmission controller. The controller applies a clutch associated with the current speed ratio, i.e., the offgoing clutch, and releases a clutch associated with a desired new speed ratio, i.e., the oncoming clutch. Precise knowledge of various control values of the offgoing and oncoming clutches in a shift maneuver is essential for optimal control and feel of the shift event.

SUMMARY

A method is disclosed herein for accurately learning clutch control values of an offgoing and an oncoming clutch used to execute a power-on upshift in a vehicle transmission. In particular, the present method learns the fill volume of the oncoming clutch and a torque/pressure relationship of the offgoing clutch during such a shift, and thereafter adapts the values as needed to optimize the shift feel. Knowledge of these clutch control values can be difficult to determine imperceptibly to a driver. The present method is therefore executed in a particular manner during a power-on upshift maneuver so as to minimize driver disturbances.

The method is executed by a controller having proportional-integral-derivative (PID) control capability, i.e., PID control logic, as is well understood in the art. At the beginning of a power-on upshift, offgoing clutch pressure is ramped down to a critical holding pressure based on previously-learned clutch torque/pressure relationship for the offgoing clutch. When slip across the offgoing clutch is zero or near zero, a small PID error is introduced in the pressure control loop of the offgoing clutch. This will result in a temporary drop in offgoing clutch pressure, as well as in a small controlled flare in engine/turbine speed. With the offgoing clutch held at critical pressure during this flare, as the torque phase of the shift is entered the offgoing clutch torque can be ramped down with a matching increase in oncoming torque.

If the oncoming clutch is insufficiently filled during the flare, oncoming clutch torque will be at or near zero. As the torque phase begins, the integrator (i.e., the I term in the three-term PID control approach) will begin to increase because the lower offgoing clutch torque will not be met with an increase in oncoming clutch torque. Likewise, if the fill volume is high the PID integrator will end up removing pressure before the fill is complete and before the torque phase has begun. Proper fill volume will show no activity in the PID logic response, and the action on the PID will not correlate with the offgoing clutch pressure. Thus, the response to an introduced PID error as set forth herein can be monitored to determine the fill volume of the oncoming clutch, and at the same time the torque/pressure relationship of the offgoing clutch.

In particular, a method is disclosed herein for determining clutch control values during a power-on upshift in a vehicle having an oncoming clutch, an offgoing clutch, and a torque converter having a turbine. The method includes dropping a pressure command to the offgoing clutch to a calibrated holding pressure after onset of the power-on upshift. The method also includes using PID logic of a controller to introduce a calibrated error into a pressure command of the offgoing clutch during a fill stage of the oncoming clutch. This causes a calibrated amount of slip to occur across the offgoing clutch, as well as a resultant threshold amount of flare to occur in the speed of the turbine.

The method also includes maintaining the calibrated amount of slip and the flare at a constant level using the PID logic, recording a clutch pressure and a corresponding cutch torque of the offgoing clutch while maintaining the slip and the flare, and determining a fill level of the oncoming clutch using a trajectory of an integrator term of the PID logic while maintaining the slip and the flare. Thereafter, the method includes adjusting a control value of the oncoming and/or the offgoing clutch using at least one of the fill level, the recorded clutch pressure, and the recorded clutch torque.

A vehicle is also disclosed. The vehicle includes a controller, a torque converter having a turbine, a transmission having an input member connected to the turbine, and a plurality of clutches. One clutch acts as an oncoming clutch and another acts as an offgoing clutch during a power-on upshift. The controller has PID logic. The controller executes the above method during the upshift to learn the clutch control values.

The above features and advantages and other features and advantages of the present invention are readily apparent from the following detailed description of the best modes for carrying out the invention when taken in connection with the accompanying drawings.

DETAILED DESCRIPTION

Figure 1:
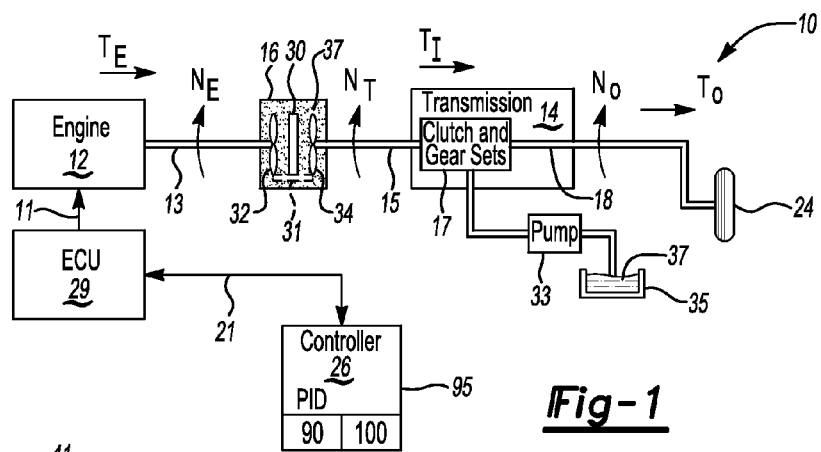
FIG. 1 is a schematic illustration of a vehicle having an automatic transmission and a controller which executes the present method for determining the fill volume of an oncoming clutch during a power-on upshift as well as the torque/pressure relationship of the offgoing clutch in the same shift maneuver.

Referring to the drawings, wherein like reference numbers correspond to like or similar components throughout the several figures, and beginning with FIG. 1, a vehicle 10 includes a controller 26 that is configured, via execution of the present method 100, to learn various clutch control values during a power-on upshift maneuver. The controller 26 does so using PID control logic as discussed below with reference to FIGS. 4 and 5. The present method 100 also learns the torque/pressure relationship of an offgoing clutch used during the same shift maneuver.

The vehicle 10 includes an internal combustion engine 12 that is coupled to an automatic transmission 14 via a hydrodynamic torque converter 16. The engine 12 delivers engine torque (arrow $T_E$) via an engine shaft 13 which rotates at engine speed (arrow $N_E$). The transmission 14 includes a transmission input shaft 15 which rotates at an input speed (arrow $N_T$). Transfer of input torque (arrow $T_I$) to the transmission 14 occurs through the torque converter 16, as is understood in the art and described below.

The transmission 14 also has an output shaft 18 that ultimately conveys a transmission output torque (arrow $T_O$) transmitted from various clutch and gear sets 17 of the transmission 14. The transmission output torque (arrow $T_O$) is ultimately delivered to a set of drive wheels 24. The clutch and gear sets 17 can be selectively actuated via electro-hydraulic controls (not shown) powered by fluid that is delivered under pressure from a fluid pump 33. The pump 33 is configured to draw fluid 37 from a transmission sump 35.

Figure 2:
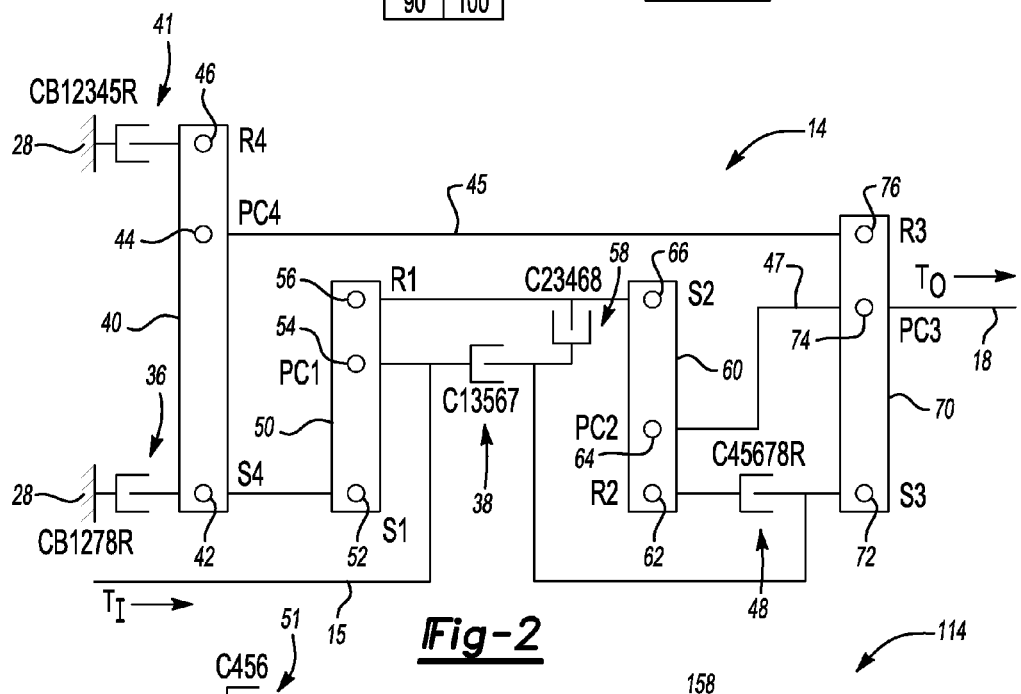
FIG. 2 is a lever diagram for an example transmission whose oncoming and offgoing clutch values may be evaluated during a power-on upshift according to the present approach.
Figure 3:
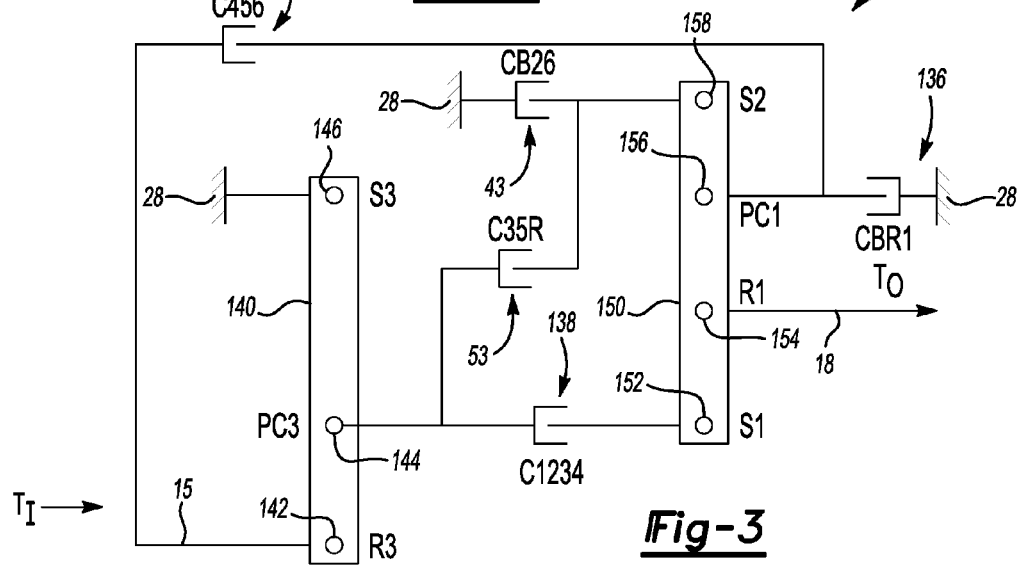
FIG. 3 is another lever diagram for an alternative example transmission to the transmission shown in FIG. 2.

The transmission 14 of FIG. 1 may be configured as any multi-speed transmission, e.g., a 6-speed or an 8-speed transmission, possible embodiments for which are described herein with reference to FIGS. 2 and 3. Thus, the clutches of the clutch and gear sets 17 may be selectively engaged and disengaged as needed to establish the desired speed ratios. In steady state, at least one of the clutches of the clutch and gear sets 17 holds input torque and is therefore referred to herein as a holding clutch.

The controller 26 selectively executes the present method 100, e.g., by executing computer code or instructions recorded on tangible, non-transitory memory 95, during a coast-down maneuver of the vehicle 10 to thereby learn the return spring pressure of the various holding clutches in the clutch and gear sets 17. An example embodiment of method 100 is disclosed below with reference to FIG. 4. Example holding clutches are described with reference to FIGS. 2 and 3.

The controller 26 may be be configured as a microprocessor-based device having such common elements as a microprocessor or CPU, and/or read only memory (ROM), random access memory (RAM), electrically-programmable read-only memory (EPROM), etc., some of which may be designated as the memory 95 noted above. The controller 26 also includes logic circuitry including but not limited to proportional-integral-derivative (PID) control logic 90, a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry.

As is understood in the art, PID controls refers to a control loop feedback mechanism using three terms, i.e., the proportion (P), integral (I), and derivative (D) terms, with each representing the respective present, past, and future error values. The portion of the control logic responsible for generating the I term is commonly referred to as an integrator. A controller using PID controls, e.g., the present controller 26, calculates an error value in a given process variable as a difference between a measured value and a desired or calibrated value and controls the process inputs as a function of the three control terms.

An engine control unit (ECU) 29 could also be used either as a separate device as shown or integrated with the controller 26. If separate, the controller 26 is in communication with the ECU 29 as indicated by double-headed arrow 21. The controller 26 may request a specific level of managed engine torque (arrow 11) from the ECU 29 as needed.

The torque converter 16 shown in FIG. 1 has a stator 30 positioned between a pump 32 and a turbine 34. A torque converter clutch 31 may also be used to selectively lock the pump 32 to the turbine 34 above a threshold lockup speed, as will be understood by those of ordinary skill in the art. The pump 32 may be coupled to the output shaft 13 to thereby rotate at engine speed (arrow $N_E$). Within the torque converter 16, the turbine 34 is driven by fluid 37, with the turbine 34 in turn connected to the input shaft 15 of the transmission 14. Thus, rotation of the turbine 34 ultimately rotates the input shaft 15 at a turbine speed (arrow $N_T$) that is less than or equal to the engine speed (arrow $N_E$), with viscous drag or friction losses within the transmission 14 tending to reduce the turbine speed (arrow $N_T$) to a level somewhat less than engine speed (arrow $N_E$), as will be readily understood by those of ordinary skill in the art.

Referring to FIG. 2, in a non-limiting example embodiment the transmission 14 of FIG. 1 may be configured as an 8-speed transmission having a plurality of gear sets and clutches, i.e., the clutches and gears 17 of FIG. 1. Depending on the operating gear, the identity of the specific clutches used in a given power-on upshift will vary. The present method 100 may be used to learn the clutch control values of the offgoing and oncoming clutches during this maneuver.

In particular, the transmission 14 may include a braking clutch CB1278R, i.e., clutch 36. The nomenclature CB1278R represents that this particular device is a braking clutch (CB), and is engaged in each of $1^{st}$, $2^{nd}$, $7^{th}$, $8^{th}$, and reverse (R) gears. The transmission 14 also includes another braking clutch CB12345R, or clutch 41, which selectively connects an element of a first gear set 40 to a stationary member 28 when engaged. Clutches 36 and 41 are connected to respective nodes 42 and 46 of first gear set 40. In one embodiment, node 42 can be a sun gear (S4) of the gear set 40, while node 46 may be a ring gear (R4) of the same gear set. Gear set 40 also includes a node 44, which may be a carrier member (PC4) in the embodiment shown.

Node 42 is also connected to a node 52 of a second gear set 50. Node 54 of gear set 50 is connected to an input side of a rotating clutch C13567, i.e., clutch 38, as is the transmission input shaft 15 with input torque (arrow $T_I$). Node 56 is connected to a third gear set 60 as explained below. In one embodiment, gear set 50 may be a planetary gear set wherein nodes 52, 54, and 56 are a sun gear (S1), a carrier member (PC1), and a ring gear (R1), respectively.

The third gear set 60 includes nodes 62, 64, and 66, which in one embodiment may be ring gear (R2), carrier member (PC2), and sun gear (S2), respectively. A rotating clutch C23468, i.e., clutch 58, may be connected between the output of clutch 38 and node 66, and between node 56 of gear set 50 and node 66 of gear set 60. Node 62 may be connected to a fourth gear set 70 having nodes 72, 74, and 76. Nodes 72, 74, and 76 may be a sun gear (S3), carrier member (PC3) and ring gear (R3), respectively. Node 76 may be continuously connected to node 44 via an interconnecting member 45. Nodes 64 and 74 may be connected via an interconnecting member 47. In particular, node 62 may be connected to node 72 via a rotating clutch C45678R, i.e., clutch 48. Node 64 of gear set 60 may be directly connected to node 74 of gear set 70, which in turn may be connected to the transmission output shaft 18 (also see FIG. 1).

Referring to FIG. 3, the transmission 14 of FIG. 2 may be alternatively embodied as a transmission 114 having a 6-speed configuration. In this embodiment, the transmission input shaft 15 may be connected to a first gear set 140 having nodes 142, 144, and 146, which may be embodied as a ring gear (R3), carrier member (PC3), and sun gear (S3) as shown. The input shaft 15 may be directly connected to node 142, and to a clutch C456, i.e., clutch 51. An interconnecting member 145 may Node 144 is connected to a clutch C1234, i.e., the clutch 138, and to an input side of a rotating clutch C35R, i.e., clutch 53. Node 146 is grounded to the stationary member 28.

A second gear set 150 includes nodes 152, 154, 156, and 158, which may be embodied as a sun gear (S1), ring gear (R1), carrier gear (PC1), and another sun gear (S2), respectively. Node 154 is directly connected to the transmission output shaft 18. Node 156 is connected to a braking clutch CBR1, i.e., clutch 136, which is also connected to a stationary member 28. Node 158 may be selectively connected to the stationary member 28 via a braking clutch CB26, i.e., clutch 43.

Figure 4:
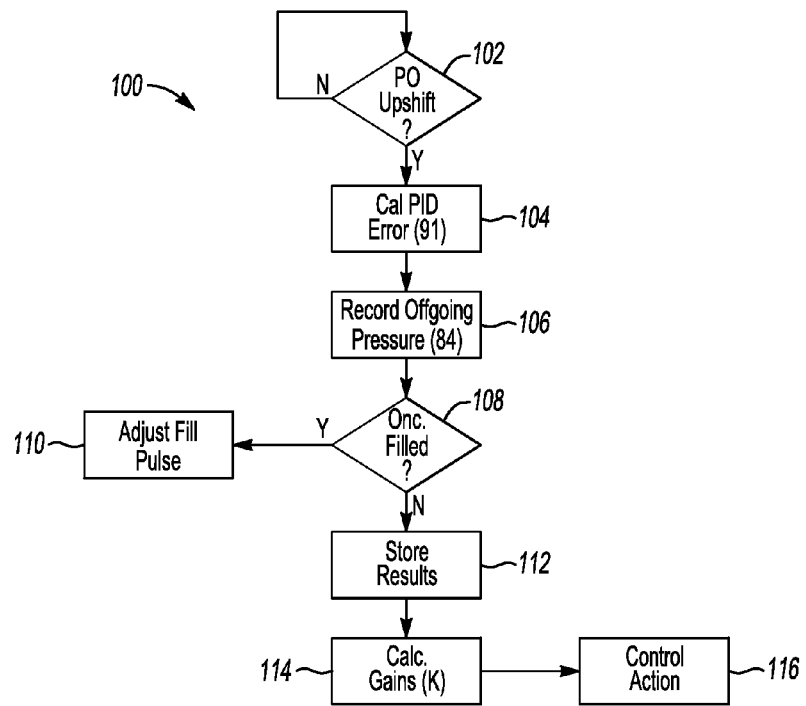
FIG. 4 is a flow chart describing an example embodiment of the present method.

Referring to FIG. 4, the present method 100 commences at step 102. In this initial step, the controller 26 of FIG. 1 determines whether a power-on upshift has been commanded and is proceeding, which may be determined from various values such as engine or turbine speed, transmission gear state, shift lever position, etc. Method 100 only progresses during a power-on upshift, and therefore step 102 is repeated until conditions are present indicative of a power-on upshift.

Upon detection of a requested power-on upshift the controller 26 of FIG. 1 drops the pressure command to the offgoing clutch to a previously learned critical holding pressure, possibly doing so using a previously-learned clutch torque/pressure relationship for the offgoing clutch. As is well understood in the art, a clutch pressure command may be determined as a function of transmission input torque ($T_I$) and a calibrated gain K, i.e., $P=f(T_{IN} \cdot K)$. The gain K can be updated with every upshift using the present method 100.

Figure 5:
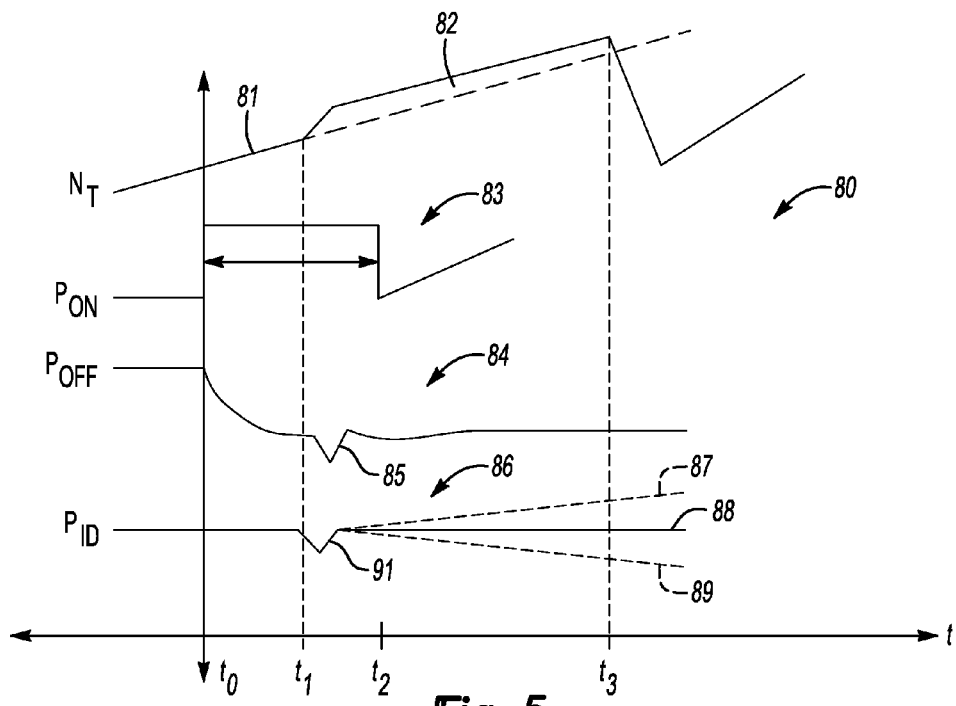
FIG. 5 is a set of traces describing various clutch control values that can be learned during a power-on upshift during execution of the present method.

Referring to FIG. 5 in conjunction with FIG. 4, an example set of curves 80 may be used to demonstrate the present approach. During an upshift, the oncoming clutch is quickly filled according over a fill duration T while the offgoing pressure command (trace 84) is decreased according to a calibrated profile. The profile may be determined via a filter as known in the art.

A PID trace 86 and turbine speed trace 81 are also shown. In step 102, when an upshift is initiated at time $t_0$, oncoming clutch pressure (trace 83) quickly rises and is held for the fill duration T, and the oncoming clutch begins to fill. If the fill duration T is too long, the oncoming clutch may be overfilled. If the fill duration T is too short, the clutch is underfilled. Thus, accurate learning and adjustment of the correct fill duration T is necessary. A way of doing this during an upshift is provided by the present method 100.

At step 104, the PID logic of controller 26 introduces a calibrated PID error as indicated by arrow 91 at approximately $t_1$. The calibrated PID error 91 in turn causes a slip to occur across the clutches, and thus a flare 82 to occur in turbine speed (trace 81) a short time after introduction of the PID error (arrow 91). Offgoing clutch pressure (trace 84) will quickly drop in response to the PID error (arrow 91), as indicated by the brief pressure dip (arrow 85) in trace 84. Initiation of the PID error should commence a short calibrated amount of time after clutch slip is at or near zero, e.g., about 100 msec. In one embodiment, the magnitude of the PID error (arrow 91) is sufficient to case the flare 82 to occur at a level of about 20 RPM to 30 RPM above the level of the trajectory of trace 81 absent the flare 82, as indicated in phantom.

At step 106, the controller 26 records the offgoing pressure, i.e., trace 84 of FIG. 5, after this pressure stabilizes beyond the pressure dip (arrow 85). At this stage, the offgoing clutch is holding all of the torque while the oncoming clutch is just completing its fill at approximately $t_2$. The torque/pressure relationship for the offgoing clutch may be recorded at this point in a lookup table and later used to calculate the required gain (K) as noted above. Flare 82 is held beyond this point in time, to about $t_3$.

At step 108 of FIG. 4, the controller 26 determines if the oncoming clutch is overfilled, underfilled, or properly filled. As explained above, the trajectory of the PID integrator term (traces 86 of FIG. 5) may be used to determine this. If properly filled, the method 100 proceeds to step 112. Otherwise, the method 100 proceeds to step 110.

As shown in FIG. 5, as the PID logic holds the flare 82 and the oncoming clutch completes its fill, the PID logic responds by quickly dropping the offgoing clutch pressure (trace 84) as indicated by arrow 85. If the oncoming clutch is not filled by this point there is no oncoming torque, and as a result the PID logic will begin to increase the value of its integral term (traces 86) for the offgoing clutch pressure (trace 84).

That is, if the observed PID response is to replace all of the pressure to the offgoing clutch that was dropped out as a result of the introduced PID error (arrow 91), then the fill volume of the oncoming clutch was in fact too low (trace 89). The opposite is true for an overfill (trace 87), i.e., the integrator will remove pressure before the fill of the oncoming clutch is over and before the torque phase of the upshift has begun. The correct fill (trace 88) is shown and reflected in the offgoing pressure (trace 84).

At step 110, the fill pulse of the oncoming clutch (trace 83) can be adjusted as needed to compensate for the results of step 108. The duration T can be increased/shortened as needed as part of step 110, for instance by changing this variable in the logic of the controller 26 for the next upshift.

At step 112, the results can be stored in a lookup table. As part of step 112, the relationship between the measured offgoing clutch pressure and corresponding torque can be recorded in a lookup table indexed by these values.

At step 114, the required gains (K) noted above can be calculated from the values of clutch pressure and torque that are recorded in the lookup table at step 112.

At step 116, a control action can be executed using the recorded values, such as but not limited to execution of a subsequent shift event using the recorded values.

While the best modes for carrying out the invention have been described in detail, those familiar with the art to which this invention relates will recognize various alternative designs and embodiments for practicing the invention within the scope of the appended claims.

The invention claimed is:

1. A method for determining clutch control values during a power-on upshift in a vehicle having a controller, an oncoming clutch, an offgoing clutch, and a torque converter having a turbine, the method comprising:

dropping a pressure command to the offgoing clutch to a calibrated holding pressure via the controller after onset of the power-on upshift;

using proportional-integral-derivative (PID) logic of the controller to introduce a calibrated error into the pressure command to the offgoing clutch during a fill stage of the oncoming clutch to thereby cause a calibrated amount of slip to occur across the offgoing clutch, and a resultant threshold amount of flare to occur in a speed of the turbine;

maintaining the calibrated amount of slip and the resultant threshold amount of flare at a constant level using the PID logic;

recording a clutch pressure and a corresponding clutch torque of the offgoing clutch while maintaining the calibrated amount of slip and the resultant threshold amount of flare;

determining a fill level of the oncoming clutch using a trajectory of an integrator term of the PID logic while maintaining the calibrated amount of slip and the resultant threshold amount of flare; and adjusting a control value of the oncoming or the offgoing clutch via the controller using at least one of the fill level, the recorded clutch pressure, and recorded clutch torque.

2. The method of claim 1, further comprising:
using the adjusted control value to control a subsequent upshift in the vehicle.

3. The method of claim 1, wherein the resultant threshold amount of flare is at least 20 revolutions per minute above a calibrated baseline turbine speed.

4. The method of claim 1, wherein adjusting a control value includes adjusting a gain value used to control one of the offgoing and the oncoming clutches.

5. The method of claim 1, wherein adjusting a control value includes increasing or reducing a fill duration of the oncoming clutch.

6. The method of claim 1, further comprising:
waiting a calibrated duration after the calibrated amount of slip reaches zero after initiation of the power-on upshift before introducing the calibrated error.

7. A vehicle comprising:
a torque converter having a turbine;
a transmission having an input member connected to the turbine, and further having a plurality of clutches, one of which acts as an oncoming clutch and another which acts as an offgoing clutch during a power-on upshift; and
a controller having proportional-integral-derivative (PID) logic that is in communication with the turbine and the plurality of clutches, wherein the controller is configured to:
drop a pressure command to the offgoing clutch to a calibrated holding pressure after onset of the power-on upshift;
use the PID logic to introduce a calibrated error into the pressure command to the offgoing clutch during a fill stage of the oncoming clutch to thereby cause a calibrated amount of slip to occur across the offgoing clutch, and to cause a resultant threshold amount of flare to occur in a speed of the turbine;
maintain the calibrated amount of slip and the resultant threshold amount of flare at a constant level using the PID logic;
record a clutch pressure and a corresponding clutch torque of the offgoing clutch while maintaining the calibrated amount of slip and the resultant threshold amount of flare;
determine a fill level of the oncoming clutch using a trajectory of an integrator term of the PID logic while maintaining the calibrated amount of slip and the resultant threshold amount of flare; and
adjust a control value of the oncoming or the offgoing clutch using at least one of the fill level, the recorded clutch pressure, and the recorded clutch torque.

8. The vehicle of claim 7, wherein the controller is further configured to:
use the adjusted control value to control a subsequent upshift in the vehicle.

9. The vehicle of claim 7, wherein the resultant threshold amount of flare is at least 20 revolutions per minute (RPM) above a calibrated baseline turbine speed.

10. The vehicle of claim 7, wherein the controller adjusts the control value by adjusting a gain value used to control one of the offgoing and the oncoming clutches.

11. The vehicle of claim 7, wherein the controller is further configured to:
adjust a the control value by increasing or reducing a fill duration of the oncoming clutch.

12. The vehicle of claim 7, wherein the controller is further configured to:
wait a calibrated duration after the calibrated amount of slip reaches zero after initiation of the power-on upshift before introducing the calibrated error.

13. A method for determining clutch control values during a power-on upshift in a vehicle having a controller, an oncoming clutch, an offgoing clutch, and a torque converter having a turbine, the method comprising:
dropping a pressure command to the offgoing clutch to a calibrated holding pressure via the controller after onset of the power-on upshift;
using proportional-integral-derivative (PID) logic of the controller to inject a calibrated error into the pressure command to the offgoing clutch during a fill stage of the oncoming clutch to thereby cause a calibrated amount of slip to occur across the offgoing clutch, and a resultant threshold amount of flare of at least 20 revolutions per minute above a baseline turbine speed to occur in a speed of the turbine;
maintaining the calibrated amount of slip and the resultant threshold amount of flare at a constant level using the PID logic;
recording a clutch pressure and a corresponding clutch torque of the offgoing clutch while maintaining the calibrated amount of slip and the resultant threshold amount of flare;
determining a fill level of the oncoming clutch using a trajectory of an integrator term of the PID logic while maintaining the calibrated amount of slip and the resultant threshold amount of flare; and
adjusting a control value of the oncoming or the offgoing clutch via the controller using the fill level, the recorded clutch pressure, and the recorded clutch torque, including adjusting a gain value used to control one of the offgoing and the oncoming clutches and adjusting the fill level of the oncoming clutch;
using the adjusted control value to control a subsequent upshift in the vehicle.

14. The method of claim 13, further comprising:
waiting a calibrated duration after the slip reaches zero after initiation of the power-on upshift before introducing the calibrated error.

* * * * *